(12) United States Patent
Noirot et al.

(10) Patent No.: US 12,156,013 B2
(45) Date of Patent: Nov. 26, 2024

(54) METHOD AND SYSTEM FOR DETERMINING SOUND EQUALISING FILTERS OF AN AUDIO SYSTEM

(71) Applicant: Faurecia Clarion Electronics Europe, Paris (FR)

(72) Inventors: Jérôme Noirot, Paris (FR); Gaël Laqueille, Levallois-Perret (FR)

(73) Assignee: Faurecia Clarion Electronics Europe, Paris (FR)

( * ) Notice: Subject to any disclaimer, the term of this patent is extended or adjusted under 35 U.S.C. 154(b) by 134 days.

(21) Appl. No.: 17/909,737

(22) PCT Filed: Mar. 4, 2021

(86) PCT No.: PCT/EP2021/055440
§ 371 (c)(1),
(2) Date: Sep. 6, 2022

(87) PCT Pub. No.: WO2021/175979
PCT Pub. Date: Sep. 10, 2021

(65) Prior Publication Data
US 2023/0108904 A1 Apr. 6, 2023

(30) Foreign Application Priority Data

Mar. 5, 2020 (FR) .................................. FR2002241

(51) Int. Cl.
*H04R 5/02* (2006.01)
*G06N 3/08* (2023.01)
(Continued)

(52) U.S. Cl.
CPC .............. *H04S 7/301* (2013.01); *G06N 3/08* (2013.01); *H04R 3/04* (2013.01); *H04R 5/02* (2013.01);
(Continued)

(58) Field of Classification Search
CPC ...... H04S 7/301; H04S 7/302; H04S 2400/11; G06N 3/08; H04R 3/04; H04R 5/02; H04R 2499/13
(Continued)

(56) References Cited

U.S. PATENT DOCUMENTS

2007/0025559 A1 2/2007 Mihelich et al.
2018/0122401 A1 5/2018 Iyer et al.
(Continued)

FOREIGN PATENT DOCUMENTS

EP 3111667 B1 * 4/2018 ............... H04R 3/04

OTHER PUBLICATIONS

Written Opinion translated into English for PCT/EP2021/055440, dated May 20, 2021, 9 pages.
(Continued)

*Primary Examiner* — Ammar T Hamid
(74) *Attorney, Agent, or Firm* — Reising Ethington P.C.

(57) ABSTRACT

A method and system for determining sound equalisation filters of an audio system having at least one loudspeaker adapted to emit audio signals and a computing device adapted to implement at least one equalisation filter. The system includes modules configured to transmit a measurement signal, and for a first predetermined spatial location, obtain a spectral amplitude curve of a received audio signal, calculate a target spectral amplitude curve, and then make a first determination of a first set of parameterizable equalisation filters which, when applied to the audio signal, reduce a distance between the spectral amplitude curve of the audio signal and the target spectral amplitude curve, and a second determination, from the first set of parameterizable equalisation filters, of a second set of parameterizable equalisation filters, by applying an iterative learning-based method. A
(Continued)

first set of optimised equalisation filters is obtained from the second set of parameterizable equalisation filters.

19 Claims, 4 Drawing Sheets

(51) Int. Cl.
*H04R 3/04* (2006.01)
*H04S 7/00* (2006.01)

(52) U.S. Cl.
CPC .......... *H04S 7/302* (2013.01); *H04R 2499/13* (2013.01); *H04S 2400/11* (2013.01)

(58) Field of Classification Search
USPC .................................................. 381/302, 310
See application file for complete search history.

(56) References Cited

U.S. PATENT DOCUMENTS

2019/0103848 A1\* 4/2019 Shaya ..................... G06F 3/167
2019/0320275 A1\* 10/2019 Audfray ................. H04S 7/301

OTHER PUBLICATIONS

French Search Report corresponding to French Application No. FR 2002241, dated Nov. 23, 2020, 2 pages.
International Search Report translation into English for PCT/EP2021/055440, dated May 20, 2021, 3 pages.

\* cited by examiner

METHOD AND SYSTEM FOR DETERMINING SOUND EQUALISING FILTERS OF AN AUDIO SYSTEM

TECHNICAL FIELD

The present invention relates to a method for determining sound equalisation filters of an audio system and a system for determining sound equalisation filters of an associated audio system.

The invention further relates to the field of optimising the reproduction of audio signals, in particular automatic sound equalisation for one or more listening locations.

The invention also relates to the field of optimising the reproduction of signals broadcast by one or more loudspeakers of an audio system in a transport vehicle interior, in particular a motor vehicle.

BACKGROUND

Typically, a vehicle interior is equipped with an audio system comprising one or more loudspeakers, for example two loudspeakers placed on either side of the interior, allowing signals to be broadcast on two separate audio channels. In addition, in a vehicle cabin, passengers are placed in distinct spatial locations, determined by rows of seats, for example the front driver and passenger seats, as well as the rear seats.

One of the problems of the automotive industry, especially for a certain category of vehicles, is to provide audio systems that ensure optimised sound reproduction, according to objective and/or subjective acoustic parameters, in a wide range of frequencies, at predetermined spatial locations. The optimisation sought comprises sound equalisation, applied before the signals are broadcast by the loudspeaker(s) of the audio system, consisting of applying equalisation filters to amplify or filter certain frequency bands, in order to obtain a desired result.

It is known to involve an experienced engineer to perform a manual optimisation of the equalisation filters to be used. Indeed, the method requires particular expertise and is complex, especially when the optimisation of sound reproduction at several spatial locations is sought. In this case, several successive manual optimisation operations are carried out.

Such manual optimisation is time-consuming and costly, and it is desirable to develop an automated method of determining sound equalisation filters that can be implemented by computing devices in limited time, with the filters obtained by the method achieving satisfactory sound reproduction performance.

SUMMARY

To this end, the invention provides a method for determining sound equalisation filters of an audio system comprising at least one loudspeaker adapted to emit audio signals and a computing device adapted to implement at least one equalisation filter, the method comprising the steps of:
a) transmitting a measurement signal, preferably pink noise, through said loudspeakers of the audio system, and, for a first predetermined spatial location, steps implemented by a processor of the computing device of:
b) acquiring amplitude values of an audio signal received at said first predetermined spatial location as a function of frequency over a predetermined frequency range, forming a spectral amplitude curve.

The method further comprising the steps of:
c) calculating a target spectral amplitude curve,
d) first determining of a first set of parameterizable equalisation filters which, when applied to the audio signal, reduce a distance between the spectral amplitude curve of the audio signal and the target spectral amplitude curve,
e) second determining, from the first set of parameterizable equalisation filters, of a second set of parameterizable equalisation filters, by applying an iterative learning method,
f) obtaining a first set of optimised equalisation filters, to be implemented in the audio system, from at least said second set of parameterizable equalisation filters.

Advantageously, the method of determining sound equalisation filters of an audio system automatically obtains equalisation filters that are optimised by implementing a double determination of parameterizable equalisation filters, allowing the spectral amplitude curve of the audio signal to be brought closer to a predetermined location of a target spectral amplitude curve.

The method of sound equalisation of an audio system according to the invention may have one or more of the following features, taken independently or in any acceptable combination.

- the iterative learning method implements deep learning based on a state matrix and/or a neural network.
- the iterative learning method uses a first optimisation criterion calculated as a function of a distance between the spectral amplitude curve and the target spectral amplitude curve.
- calculating a target spectral amplitude curve comprises selecting a spectral amplitude curve model, and translating said spectral amplitude curve model by a value that minimises a distance between said spectral amplitude curve and the spectral amplitude curve model.
- the first determination comprises, for at least one peak of said spectral amplitude curve, a calculation of parameters of a parameterizable equalisation filter for reducing a distance between said peak and a corresponding point on the target spectral amplitude curve.
- each parameterizable equalisation filter is defined by a set of parameters, the obtaining of the first set of optimised equalisation filters to be implemented in the audio system comprising a step of adjusting the parameters of at least some of the filters of said second set of parameterizable equalisation filters, said adjustment being performed according to a second predetermined optimisation criterion.
- the parameter adjustment step comprises the implementation of a regularized gradient descent cost function minimisation.
- the method further comprises a repetition of steps b) to e) for a second predetermined spatial location, whereby a third set of parameterizable equalisation filters associated with said second spatial location is obtained by said step e).
- the method further comprises a joint optimisation step to obtain a second set of optimised equalisation filters from said second and third sets of parameterizable equalisation filters, said second set of optimised equalisation filters comprising equalisation filters optimised for the first spatial location, equalisation filters optimised for the second spatial location and equalisation filters jointly optimised for the first spatial location and for the second spatial location.

the joint optimisation step comprises calculating a similarity measure between the parameterizable equalisation filters of the second set and the parameterizable equalisation filters of the third set, and comparing the calculated similarity measure to a predetermined similarity threshold, thereby determining a subset of related parameterizable equalisation filters applicable to both the first spatial location and the second spatial location.

the joint optimisation step further comprises a determination of a subset of parameterizable equalisation filters associated with the first spatial location, a subset of parameterizable equalisation filters associated with the second spatial location, and comprises a substep of adjusting the parameters of the parameterizable equalisation filters, implementing a regularized gradient descent.

the adjustable equalisation filters are biquadratic filters.

According to another aspect, the invention relates to an audio system comprising at least one loudspeaker adapted to emit audio signals and a computing device adapted to implement at least one audio signal equalisation filter determined by a method of determining sound equalisation filters as briefly described above.

According to another aspect, the invention relates to a system for determining sound equalisation filters of an audio system comprising at least one loudspeaker adapted to emit audio signals and a computing device having a processor configured to implement a module for generating a measurement signal, preferably pink noise, for emission through said loudspeakers of the audio system, and, for a first predetermined spatial location, a module for acquiring amplitude values of an audio signal received at said first predetermined spatial location, as a function of frequency, over a predetermined frequency range, forming a spectral amplitude curve. The processor is configured to implement:

a module for calculating a target spectral amplitude curve, a module for first determining of a first set of parameterizable equalisation filters which, when applied to the audio signal, reduce a distance between the spectral amplitude curve of the audio signal and the target spectral amplitude curve, a module for second determining, from the first set of parameterizable equalisation filters, of a second set of parameterizable equalisation filters, by applying an iterative learning method, a module for obtaining a first set of optimised equalisation filters, to be implemented in the audio system, from at least said second set of parameterizable equalisation filters.

BRIEF DESCRIPTION OF THE DRAWINGS

Further features and advantages of the invention will become apparent from the detailed description given below, by way of indication and not in any way limiting, with reference to the appended figures, in which.

DETAILED DESCRIPTION

The invention will be described hereafter in its application to the determination of sound equalisation filters for a motor vehicle audio system.

Figure 1:
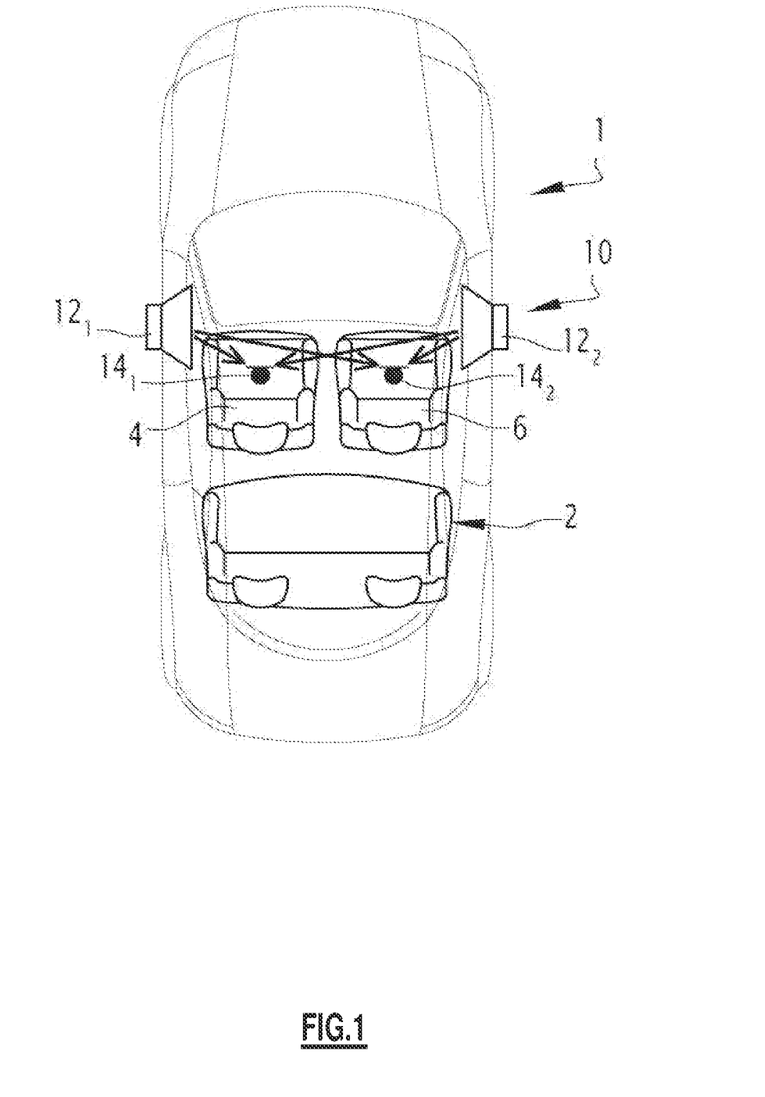
FIG. 1 shows a schematic of a vehicle with a two-speaker audio system.

FIG. 1 schematically illustrates a motor vehicle 1 comprising a passenger compartment 2 comprising a plurality of seats, for example divided into rows, for example a so-called front row and a so-called rear row, adapted to receive passengers. The passenger compartment 2 comprises a left front seat 4 and a right front seat 6.

The passenger compartment comprises an audio system 10, comprising, in the example of FIG. 1, a first loudspeaker $12_1$ and a second loudspeaker $12_2$, the first loudspeaker $12_1$ being located on the left side of the passenger compartment 2, in the vicinity of the left front seat 4, and the second loudspeaker $12_2$ being located on the right side of the passenger compartment 2, in the vicinity of the right front seat 6. This is, of course, an example, as any other location for the loudspeakers is possible.

The loudspeakers $12_1$, $12_2$ are adapted to emit audio signals from a sound signal source, for example a music player or car radio, and then processed by a processing system (not shown), using a number of signal processing modules including the application of equalisation filters.

The transmitted audio signals are picked up by microphones $14_1$, $14_2$, located respectively, in the example of FIG. 1, at the left front seat 4 and the right front seat 6. Each microphone is located at an associated spatial location, which is for example located in a spatial reference frame associated with the passenger compartment 2.

Arrows in FIG. 1 schematically show the broadcasting of audio signals from the two loudspeakers $12_1$, $12_2$, which are picked up by the two microphones $14_1$, $14_2$ respectively.

Figure 2:
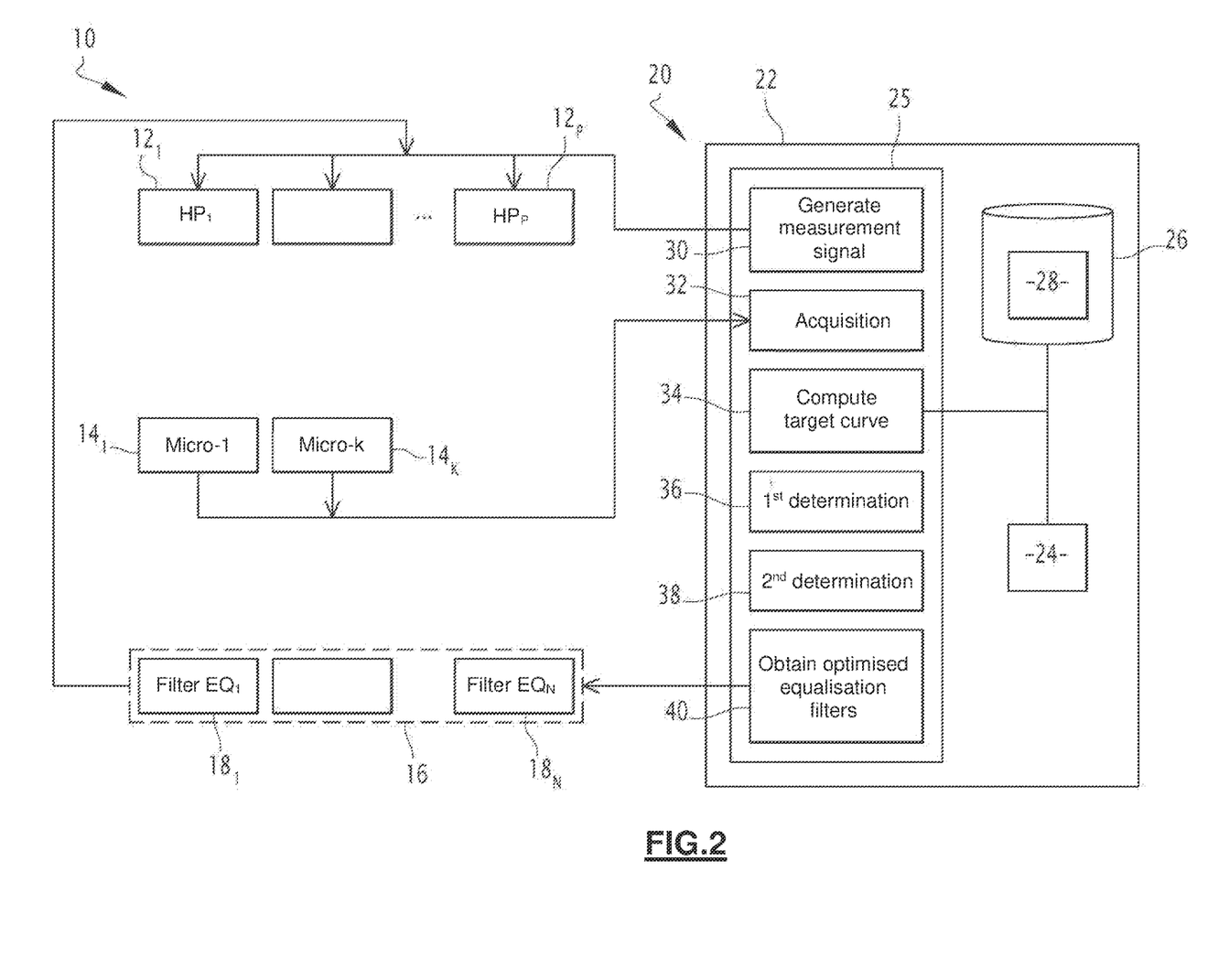
FIG. 2 is a schematic representation of a system for determining sound equalisation filters of an audio system according to one embodiment.

FIG. 2 shows schematically a system 20 for determining equalisation filters according to one embodiment of the invention, for sound equalisation of an audio system 10.

The audio system 10 has P loudspeakers $12_1$ to $12_P$, where P is an integer greater than or equal to one. A number K of microphones $14_1$ to $14_K$, where K is an integer greater than or equal to 1, adapted to pick up the sound emitted by the loudspeakers, form part of the equalisation filter determination system 20.

The microphones are placed at spatial locations of interest for listening, as explained with reference to FIG. 1.

The audio system 10 further comprises audio tuning firmware 16, adapted to implement various processes to optimise the playback of audio signals at different listening locations.

The audio playback control system 16 has modules $18_1$ to $18_N$ configured to apply sound equalisation filters. For example, the control system 16 is a computing device for the audio system 10.

Equalisation filters are filters that can be parameterised, for example biquadratic filters. A biquadratic filter is known per se and is a second-order linear recursive filter. The transfer function of such a biquadratic filter is a ratio between two quadratic functions.

The modules $18_1$ to $18_N$ of the control system 16 of the audio system 10 implement optimised equalisation filters, the parameters of which are determined by a sound equalisation filter determination method according to the invention, as described in more detail below, implemented by an equalisation filter determination system 20.

The equalisation filter determination system 20 furthermore comprises an equalisation filter determination device 22, which is a computing device, for example a computer, with an electronic computing unit 24, an electronic memory 25 and an electronic memory 26, which are suitable for storing data in the form of files or registers.

The equalisation filter determination system 20 comprises:
- a module 30 for generating a measurement signal, this measurement signal being transmitted to the loudspeakers $12_1$ to $12_N$ or emission of this audio signal by the audio system 10;
- a module 32 for obtaining a measurement signal received by each of the microphones $14_1$ to $14_K$, in the form of amplitude values as a function of frequency, each microphone being placed at a predetermined spatial location.
- a module 34 for calculating a target spectral amplitude curve, for each spatial location considered, from previously recorded spectral amplitude curve models 28;
- a module 36 for the first determination of a first set of parameterizable equalisation filters;
- a module 38 for the second determination of a second set of parameterizable equalisation filters;
- a module 40 for obtaining a first group of equalisation filters optimised for a predetermined spatial location, and optionally a second group of equalisation filters optimised for two spatial locations.

The optimised equalisation filters are to be implemented in the audio system 10, before the signal is emitted from the loudspeakers $12_1$ to $12p$.

In the example of FIG. 2, the modules 30 to 40, are each in the form of software which can be executed by the processor 24. This software forms a computer program, comprising code instructions which, when executed by the computer processor 24, implement the method of determining equalisation filters according to the invention.

The memory 25 of the computing device 22 is then able to store software for determining equalisation filters according to the invention.

The computer program is further adapted to be recorded on a computer-readable medium, not shown. The computer-readable medium is, for example, a medium that can store electronic instructions and be coupled with a bus from a computer system. For example, the readable medium is an optical disk, magneto-optical disk, ROM memory, RAM memory, any type of non-volatile memory (for example EPROM, EEPROM, FLASH, NVRAM), magnetic card or optical card.

In a variant not shown, the modules 30 to 40 are each in the form of a programmable logical component, such as a FPGA (Field Programmable Gate Array), or in the form a dedicated integrated circuit, such as an ASIC (Application-Specific Integrated Circuit).

A first embodiment of a method for determining sound equalisation filters according to the invention will be described below with reference to FIG. 3.

In this first embodiment, the method comprises a first step 50 of obtaining a spectral amplitude curve, corresponding to a first predetermined spatial listening location $P_1$.

A spectral amplitude curve is defined here as a frequency response curve to an audio signal played in the audio system.

The first spatial location $P_1$ is, for example, in the case of a vehicle interior, associated with a vehicle seat.

Figure 3:
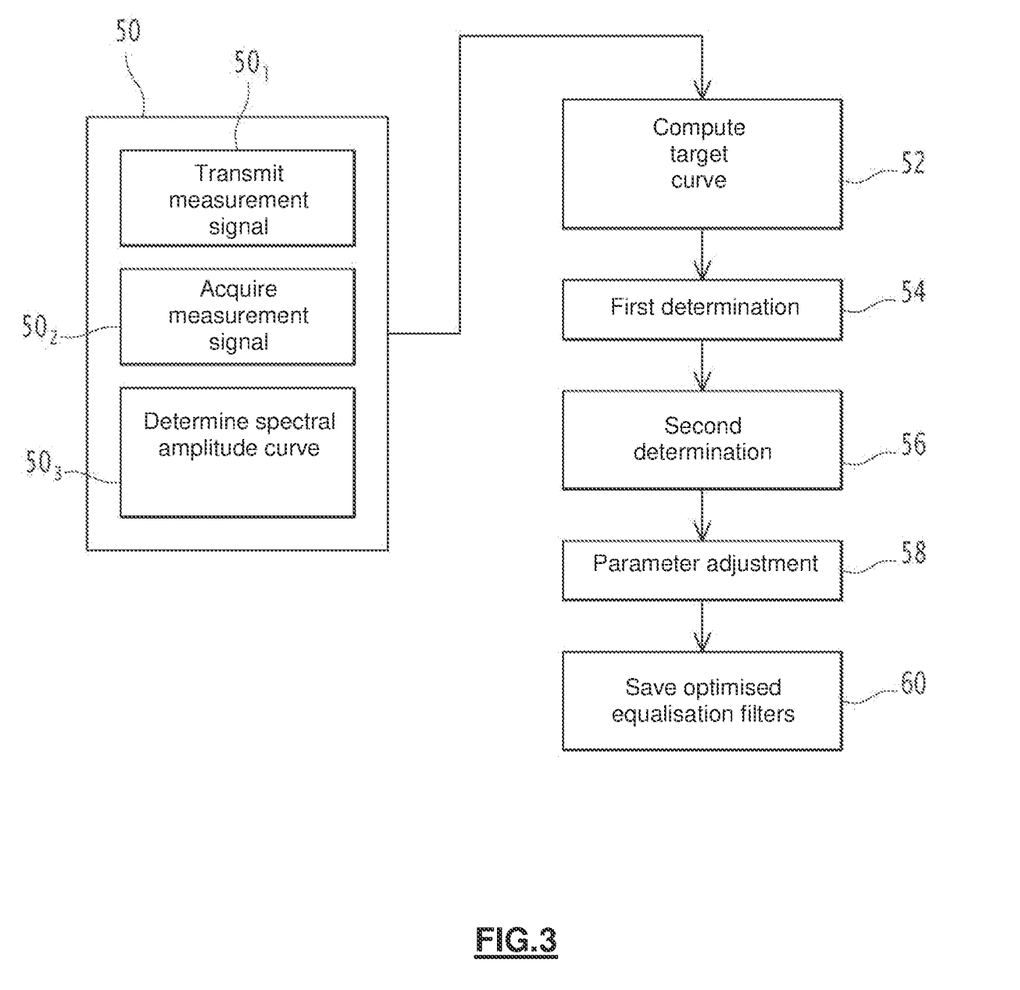
FIG. 3 is a flowchart of the main steps of a method for determining sound equalisation filters of an audio system according to a first embodiment of the invention.

In an embodiment illustrated in FIG. 3, step 50 comprises transmitting $50_1$ a measurement signal through the loudspeaker(s) of the audio system, acquiring $50_2$ the measurement signal by one or more microphones arranged in the vicinity of said first spatial listening location $P_1$, and determining $50_3$ spectral amplitude values as a function of frequency, over a given frequency range. The spectral amplitude curve is determined using the following protocol: A signal is emitted from the loudspeakers and then recorded via the microphones. The transmitted signal and the acquired signal are then used to calculate this curve.

These spectral amplitude values as a function of frequency form a spectral amplitude curve associated with the spatial location $P_1$.

The measurement signal is preferably pink noise, which is a random signal with a constant spectral density per octave band. Its power spectral density is inversely proportional to the signal frequency.

The spectral amplitude curve acquired in step 50 is stored in a memory of the computing device.

The method also comprises a step 52 of calculating a target spectral amplitude curve for the first spatial location $P_1$, which will be referred to simply as the target curve hereafter.

The target curve is obtained from a pre-calculated spectral amplitude curve model, e.g. for the passenger compartment in which the audio system is installed, which provides an optimised adjustment between low, medium, and high frequencies.

In step 52 of calculating a target curve, a spectral amplitude curve model is selected, and then a translation is applied to this spectral amplitude curve model as a function of a gain $G_{min}$.

For example, the gain $G_{min}$ is calculated as the gain that minimises a distance, for example the squared distance, between the spectral amplitude curve acquired in step 50 and the spectral amplitude curve model. Then the target curve is calculated from the spectral amplitude curve model to which the gain $G_{min}$ is added and the standard deviation of the regression is subtracted.

Preferably, the squared distance is calculated from the discretization of the acquired spectral amplitude curve and the target spectral amplitude curve, according to a mel-frequency cepstrum or logarithmic frequency distribution. The mel distribution, which is well-known for audio signal processing, has the advantage of being represented on a frequency scale better suited to the sensitivity of the ear.

The calculated target curve is also stored in a memory of the computing device.

The method then comprises a first determination 54 of a first set of parameterizable equalisation filters.

In the preferred embodiment, the equalisation filters are biquadratic filters.

In a known way, a biquadratic filter $F_0$ can be defined by 4 parameters which are: the type of filter, the centre frequency $f_0$, the gain $g_0$ and the Q-factor $q_0$ where: $q_0 = f_0/\Delta f$ where $\Delta f$ is the bandwidth of the system resonance.

The type of filter indicates whether it is a plateau or a peak filter, as well as the frequency band involved: high-pass, low-pass, notch or bandpass.

In one embodiment, the first set of parameterizable equalisation filters comprises all filters that can reduce a distance between the spectral amplitude curve and the target curve, in particular a distance between a peak of the spectral amplitude curve and the target curve.

For example, for each local maximum of the spectral amplitude curve, a peak filter having as its centre frequency the frequency associated with the local maximum and a gain equal to the relative deviation of the local maximum from the corresponding value of the target curve is added to the first set of candidate equalisation filters.

Furthermore, in one embodiment, plateau filter parameters for reducing a distance between the acquired spectral amplitude curve and the target curve are also calculated, and the filters thus determined are added to the first set of candidate equalisation filters.

The first set of equalisation filters determined in this way is stored.

The first set of equalisation filters thus obtained comprises a number of filters of, for example, the order of 20 to 30 filters.

The method then comprises a second determination 56 of a second set of parameterizable equalisation filters, from the stored first set of parameterizable equalisation filters.

Advantageously, the second determination 56 is carried out by applying an iterative learning-based method.

Preferably, the iterative learning method implements deep learning based on a state matrix and/or a neural network.

These are methods used in the field of artificial intelligence.

The state-matrix-based deep learning method, also known as the "Q-learning method", makes it possible to test several combinations of equalisation filters from the first set of equalisation filters, in order to select the best combination according to a first optimisation criterion, which is the minimisation of a distance, e.g. the squared distance, between the spectral amplitude curve after applying the equalisation filters and the target curve.

Preferably, the squared distance is calculated according to a mel or logarithmic frequency distribution.

To implement the Q-learning method, a maximum number N of filters to be combined, as well as a learning factor value (a factor) and a discount factor value (γ factor) are set.

For example, α=0.5, γ=0.5 and N=12. In one embodiment, the number of iteration is for example set to 5,000.

In an alternative embodiment, the second determination 56 is implemented by applying a neural network, trained from the results of the state-matrix-based deep learning method, to a set of spectral curves measured in different vehicles. For example, the learning base contains about fifty spectral amplitude curves.

For example, each parameterizable equalisation filter $F_k$ is associated with a score which is calculated as a sum weighted by weighting coefficients, of characteristics associated with the filter $F_k$, in particular characteristics calculated from the parameters $f_k$, $q_k$ and $g_k$ of the filter, the number of parameterizable equalisation filters close to the filter $F_k$ within a limit of one-third of an octave around the central frequency $f_k$, the gain of the filter $F_k$, the spectral resolution.

The weighting coefficients are obtained by training the neural network from the results of the state-matrix-based deep learning method.

The N equalisation filters with the highest associated score are selected to form the second set of candidate equalisation filters.

The method optionally further comprises a step 58 of adjusting the parameters of the filters of the second set of candidate equalisation filters, in order to obtain an optimised first group of equalisation filters.

The purpose of this step is to slightly modify, according to predetermined modification margins, the parameters of each filter, or at least some of the filters, of the second set of filters according to a second predetermined optimisation criterion.

The predetermined margins of change are, for example, that the filter frequencies can vary within half an octave, the gains can vary within a few dB and the quality factors can vary by a few points.

For example, step 58 implements an optimisation algorithm known in the field of numerical optimisation as "regularized gradient descent".

The second optimisation criterion is the minimisation of a cost function, depending on the square distance between the spectral amplitude curve equalised by applying all the filters of the second set of equalisation filters and the target curve, in a predetermined frequency range.

In one embodiment, for an equalisation filter $F_i$ the parameters are the central frequency parameters $f_i$, the gain $g_i$ and the quality factor $q_i$.

A global matrix B of the filter parameters of the second set of equalisation filters is written:

$$B = \begin{bmatrix} f_1 & g_1 & q_1 \\ \vdots & \vdots & \vdots \\ f_N & g_N & q_N \end{bmatrix} \quad \text{[Math 1]}$$

A gradient with respect to each parameter of each equalisation filter is estimated, and the gradient matrix is given by the formula:

$$\nabla J = \begin{bmatrix} \frac{\partial J}{\partial f_1} & \frac{\partial J}{\partial g_1} & \frac{\partial J}{\partial q_1} \\ \vdots & \vdots & \vdots \\ \frac{\partial J}{\partial f_N} & \frac{\partial J}{\partial g_N} & \frac{\partial J}{\partial q_N} \end{bmatrix} \quad \text{[Math 2]}$$

Where J is the squared distance between the spectral amplitude curve equalised by applying all the filters in the second set of equalisation filters and the target curve.

The gradient descent optimisation algorithm is well known to a person skilled in the art.

The sequence of iterative adjustments of the parameters of the global parameter matrix B is performed by:

$$B \leftarrow B - \alpha \nabla J - \lambda \Sigma_i (f_i + g_i + q_i) \quad \text{[Math 3]}$$

The gradient descent optimisation is performed under constraints on the minimum and maximum values of each equalisation filter parameter.

For example α=0.02 and λ=1.

An iterative optimisation for a predetermined number of iterations is applied. For example, the number of iterations is 500.

At the end of the parameter adjustment step 58, a first group of optimised equalisation filters is obtained, and the parameters of the optimised filters are stored in the storage step 60 in association with the first predetermined spatial location.

In one embodiment, the second set of parameterizable equalisation filters obtained in step 56 is stored as the first set of optimised equalisation filters for implementation in the audio system 10.

Of course, the method described above is applicable for several spatial locations, to obtain for each spatial location a group of associated optimised equalisation filters.

The optimised equalisation filters are then applied in the audio system.

Figure 4:
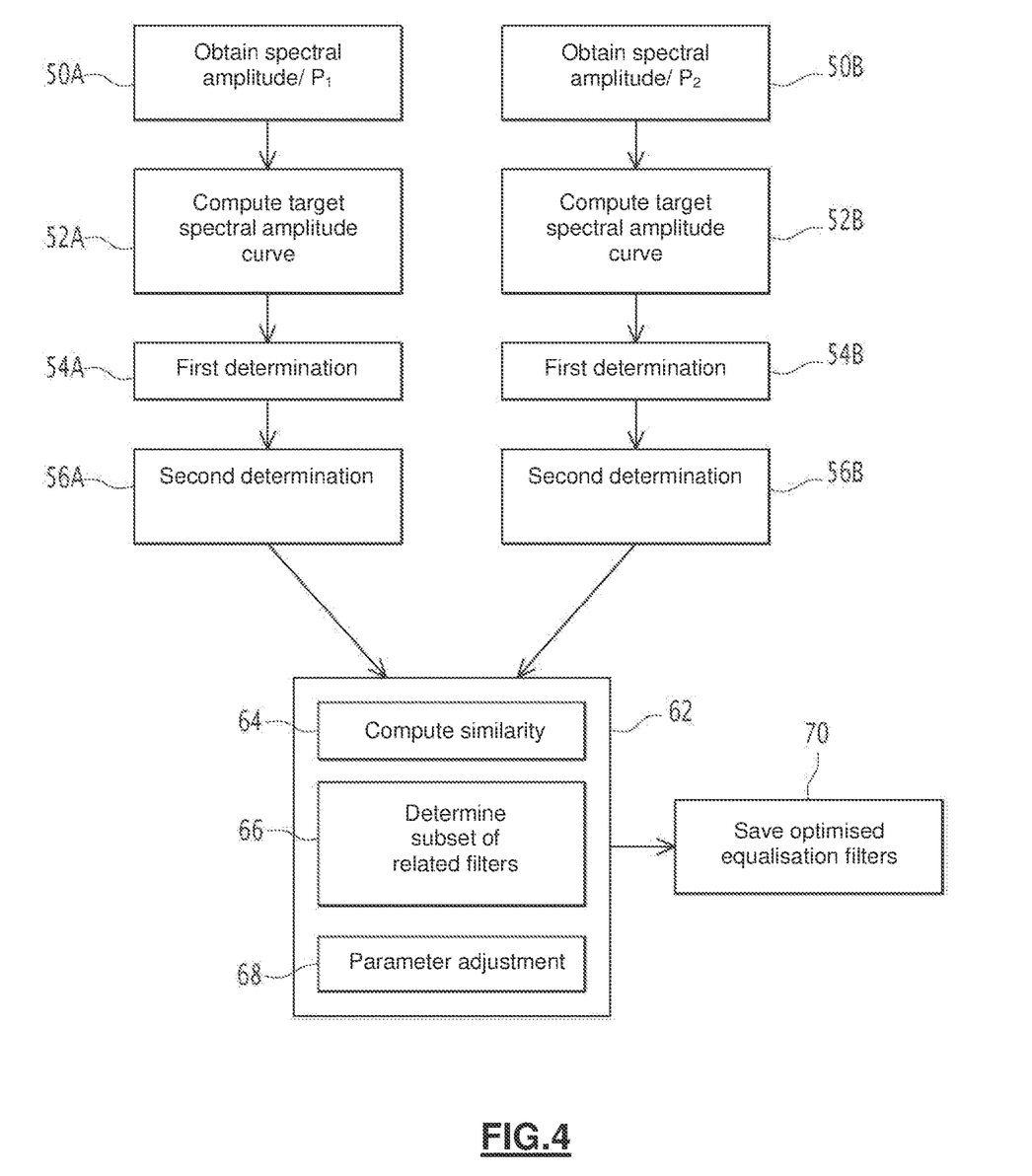
FIG. 4 is a flowchart of the main steps of a method for determining sound equalisation filters of an audio system according to a second embodiment of the invention.

A second embodiment of a method for determining sound equalisation filters according to the invention will be described below with reference to FIG. 4.

In this second embodiment, the method for determining equalisation filters is applied for two predetermined spatial locations, $P_1$ and $P_2$.

For example, when applied to a motor vehicle, the first spatial location $P_1$ corresponds to the left front seat and the second spatial location $P_2$ corresponds to the right front seat.

The method comprises steps 50A of obtaining a spectral amplitude curve, 52A of calculating a target spectral amplitude curve, 54A of first determining a first set of equalisation filters and 56A of second determining a second set of equalisation filters, analogous to the previously described steps 50 to 56 implemented for the first spatial location $P_1$, as well as steps 50B to 56B, analogous to the steps 50 to 56 implemented for the second spatial location $P_2$.

At the end of step 56A, a second set of equalisation filters associated with the first spatial location is obtained.

At the end of step 56B, a third set of equalisation filters associated with the second spatial location is obtained.

Alternatively, filter parameter adjustment steps 58A and 58B are applied after steps 56A and 56B respectively, to obtain a second set of optimised equalisation filters and a third set of optimised equalisation filters.

The method further comprises a step 62 of jointly optimising the equalisation filters of the second set of equalisation filters associated with the first spatial location and the third set of equalisation filters associated with the second spatial location.

Step 62 comprises a substep 64 of calculating a similarity measure between the equalisation filters of the second set and the equalisation filters of the third set, and comparing the calculated measure to a predetermined similarity threshold Sim_th, allowing to determine in a determination substep 66, a subset S° of linked parameterizable equalisation filters, applicable for both the first spatial location and the second spatial location.

In one embodiment, consider the second set $B^{(1)}$ of equalisation filters associated with the first spatial location:

$$B^{(1)} = \{F_1^{(1)}(f_{,1}^{(1)}, g_1^{(1)}, q_1^{(1)}), \ldots ,$$ [Math 4]
$$F_i^{(1)}(f_i^{(1)}, g_i^{(1)}, q_i^{(1)}), \ldots , F_N^{(1)}(f_N^{(1)}, g_N^{(1)}, q_N^{(1)})\}$$

And the third set $B^{(2)}$ of equalisation filters associated with the second spatial location:

$$B^{(2)} = \{F_1^{(2)}(f_1^{(2)}, g_1^{(2)}, q_1^{(2)}), \ldots ,$$ [Math 5]
$$F_i^{(2)}(f_i^{(2)}, g_i^{(2)}, q_i^{(2)}), \ldots , F_N^{(2)}(f_N^{(2)}, g_N^{(2)}, q_N^{(2)})\}$$

In this embodiment, the second and third sets of equalisation filters comprise the same number N of filters.

In one embodiment, the second set of equalisation filters comprises a number N1 of filters and the third set of equalisation filters comprises a number N2 of filters, N1 and N2 being different integers.

In step 62, for each filter $F_k^{(1)}$ of the set $B^{(1)}$, the following similarity measure is calculated:

$$\text{Sim\_ratio}(F_k^{(1)}, F_l^{(2)}) = \frac{2\|\text{intersect}((F_k^{(1)}, F_l^{(2)})\|^2}{\|F_k^{(1)}\|^2 \|F_l^{(2)}\|^2}$$ [Math 6]

Where $\|F_k^{(1)}\|^2$ is the norm of the filter $F_k^{(1)}$, equal to the area of the modulus of the frequency response of the filter $F_k^{(1)}$ and intersect($F_k^{(1)}$, $F_l^{(2)}$) is the intersection between the area of the modulus of the frequency response of the filter $F_k^{(1)}$ and the area of the modulus of the frequency response of the filter $F_l^{(2)}$.

Two equalisation filters $F_{k0}^{(1)}$ and $F_{l0}^{(2)}$ are considered similar if:

$$l0 = \underset{l}{\text{argmax}}\left(\text{Sim\_ratio}(F_{k0}^{(1)}, F_l^{(2)})\right)$$
$$\text{Sim\_ratio}(F_{k0}^{(1)}, F_{l0}^{(2)}) \geq \text{Sim\_th}$$

For example, the Sim_th similarity threshold is 70%.

When it is determined that two equalisation filters $F_k^{(1)}$ and $F_{l0}^{(2)}$ are similar, they are linked and added to the S° subset of linked equalisation filters.

The parameters of the two linked filters are equalised.

Thus, at the end of sub-step 66, from the second set of equalisation filters and the third set of equalisation filters, three subsets of equalisation filters are obtained which are:
- the subset S° of linked equalisation filters, determined as above,
- a subset $S^1 = B^{(1)} \setminus S^0$ of equalisation filters associated with the first spatial location, and
- a subset $S^2 = B^{(2)} \setminus S^0$ of equalisation filters associated with the second spatial location.

In a sub-step 68 of adjusting the parameters of the equalisation filters, a regularized gradient descent optimisation algorithm, already described with reference to step 58 described above with reference to FIG. 3, is applied in order to obtain a second group of optimised equalisation filters, comprising jointly optimised equalisation filters for the first spatial location $P_1$ and for the second spatial location $P_2$.

Sub-step 68 implements a common cost function to jointly optimise the filter subsets $S^0$, $S^1$ and $S^2$, implementing the target curves calculated in steps 52A, 52B. In one embodiment step 68 implements:
  for the subset of equalisation filters $S^1$ associated with the first spatial location, a first cost function, dependent on the squared distance between the spectral amplitude curve obtained for the first spatial location (in step 50A), equalised by applying all the equalisation filters of the subset $S^1$, and the corresponding target curve determined in step 52A;
  for the subset of equalisation filters $S^2$ associated with the second spatial location, a second cost function, dependent on the squared distance between the spectral amplitude curve obtained for the second spatial location (in step 50B), equalised by applying all the equalisation filters of the subset $S^2$, and the corresponding target curve determined in step 52B;
  for the subset S° of linked equalisation filters, a third cost function which is the sum of:
    a fourth function equal to the squared distance between the spectral amplitude curve obtained for the first spatial location (in step 50A), equalised by applying all the equalisation filters of the subset S° and the corresponding target curve determined in step 52A;
    a fifth function equal to the squared distance between the spectral amplitude curve obtained for the second spatial location (in step 50B), equalised by applying all the equalisation filters of the subset S° and the corresponding target curve determined in step 52B.

An overall cost function is calculated by summing the first, second and third cost functions, and a minimisation of the overall cost function, performed as explained with reference to step 58, is applied.

Adjustments to the filter parameters are made within predetermined ranges of change.

Advantageously, the second group of optimised equalisation filters comprises equalisation filters optimised for the first spatial location $P_1$, equalisation filters optimised for the second spatial location $P_2$, and equalisation filters optimised jointly for the first spatial location $P_1$ and for the second spatial location $P_2$.

The parameters of the optimised equalisation filters of the second group are stored in the storage step 60 in association with the first and second spatial locations.

Advantageously, the invention allows automation of the determination of optimised automation filters, which is otherwise time-consuming and tedious when implemented by a specialist engineer.

The invention claimed is:

1. A method for determining sound equalisation filters of an audio system comprising at least one loudspeaker adapted to emit audio signals and a computing device adapted to implement at least one equalisation filter, the method comprising the steps of:
   a) transmitting a measurement signal, through the loudspeakers of the audio system;
   b) for a first predetermined spatial location,
   acquiring amplitude values of an audio signal received at the first predetermined spatial location as a function of frequency over a predetermined frequency range, forming a spectral amplitude curve;
   c) calculating a target spectral amplitude curve;
   d) first determining of a first set of parameterisable equalisation filters which, when applied to the audio signal, reduce a distance between the spectral amplitude curve of the audio signal and the target spectral amplitude curve;
   e) second determining, from the first set of parametrisable equalisation filters, of a second set of parametrisable equalisation filters, by applying an iterative learning method; and
   f) obtaining a first set of optimised equalisation filters, to be implemented in the audio system, from at least the second set of parameterisable equalisation filters;
   wherein steps b)-f) are implemented by a processor of the computing device; and
   wherein:
   each parameterisable equalisation filter is defined by a set of parameters, the obtaining of the first set of optimised equalisation filters to be implemented in the audio system comprising a step of adjusting the parameters of at least two of the filters of the second set of parameterisable equalisation filters, the adjustment being performed according to a second predetermined optimisation criterion; and/or
   the method further comprises a repetition of steps b) to e) for a second predetermined spatial location, whereby a third set of parameterisable equalisation filters associated with the second spatial location is obtained by the step e).

2. The method according to claim 1, wherein the iterative learning based method implements state-matrix-based deep learning and/or neural network.

3. The method according to claim 2, wherein the iterative learning method uses a first optimisation criterion calculated as a function of a distance between the spectral amplitude curve and the target spectral amplitude curve.

4. The method according to claim 1, wherein calculating a target spectral amplitude curve comprises selecting a spectral amplitude curve model, and translating the spectral amplitude curve model by a value that minimises a distance between the spectral amplitude curve and the spectral amplitude curve model.

5. The method according to claim 1, wherein the first determination comprises, for at least one peak of the spectral amplitude curve, calculating parameters of a parameterisable equalisation filter for reducing a distance between the peak and a corresponding point of the target spectral amplitude curve.

6. The method of claim 1, wherein the obtaining of the first set of optimised equalisation filters to be implemented in the audio system comprises the step of adjusting the parameters of the at least two filters of the second set of parameterisable equalisation filters.

7. The method according to claim 6, wherein the adjusting the parameters comprises implementing a minimisation of a cost function by regularised gradient descent.

8. The method of claim 1, further comprising the repetition of steps b) to e) for a second predetermined spatial location, whereby the third set of parameterisable equalisation filters associated with the second spatial location is obtained by the step e).

9. The method according to claim 8, further comprising a joint optimisation to obtain a second set of optimised equalisation filters from the second and third sets of parameterisable equalisation filters, the second set of optimised equalisation filters comprising equalisation filters optimised for the first spatial location, equalisation filters optimised for the second spatial location and equalisation filters jointly optimised for the first spatial location and for the second spatial location.

10. The method according to claim 9, wherein the joint optimisation comprises calculating a similarity measure between the parameterisable equalisation filters of the second set and the parameterisable equalisation filters of the third set, and comparing the calculated similarity measure to a predetermined similarity threshold, thereby determining a subset of related parameterisable equalisation filters applicable to both the first spatial location and the second spatial location.

11. The method according to claim 10, wherein the joint optimisation further comprises a determination of a subset of parameterisable equalisation filters associated with the first spatial location, a subset of parameterisable equalisation filters associated with the second spatial location, and comprises adjusting the parameters of the parameterisable equalisation filters, implementing a regularised gradient descent.

12. The method according to claim 1, wherein the parameterisable equalisation filters are biquadratic filters.

13. An audio system comprising at least one loudspeaker adapted to emit audio signals and a computing device adapted to implement at least one audio signal equalisation filter determined according to the method of claim 1.

14. A system for determining sound equalisation filters of an audio system comprising at least one loudspeaker adapted to emit audio signals and a computing device having a processor configured to implement a module for generating a measurement signal, for emission through the loudspeakers of the audio system, and, for a first predetermined spatial location, a module for acquiring amplitude values of an audio signal received at the first predetermined spatial location, as a function of frequency, over a predetermined frequency range, forming a spectral amplitude curve, wherein the processor is configured to implement:

a module for calculating a target spectral amplitude curve, a module for first determining of a first set of parameterisable equalisation filters which, when applied to the audio signal, reduce a distance between the spectral amplitude curve of the audio signal and the target spectral amplitude curve, a module for second determining, from the first set of parametrisable equalisation filters, of a second set of parametrisable equalisation filters, by applying an iterative learning method, a module for obtaining a first set of optimised equalisation filters, to be implemented in the audio system, from at least said second set of parameterisable equalisation filters;

wherein:

each parameterisable equalisation filter is defined by a set of parameters, the obtaining of the first set of optimised equalisation filters to be implemented in the audio system comprising a step of adjusting the parameters of at least two of the filters of the second set of parameterisable equalisation filters, the adjustment being performed according to a second predetermined optimisation criterion; and/or the system is further configured to further implement: a module for acquiring the amplitude values of the audio signal; a module for calculating the target spectral amplitude curve; a module for first determining of the first set of parameterisable equalisation filters; and a module for second determining, from the first set of parametrisable equalisation filters, a second set of parametrisable equalisation filters, by applying an iterative learning method, for a second predetermined spatial location, whereby a third set of parameterisable equalisation filters associated with the second spatial location is obtained by the module for second determining of the second set of parametrisable equalisation filters.

15. The system according to claim 14, wherein the measurement signal comprises pink noise.

16. The audio system according to claim 13, wherein the measurement signal comprises pink noise.

17. The method according to claim 1, wherein the measurement signal comprises pink noise.

18. The system of claim 14, wherein the obtaining of the first set of optimised equalisation filters to be implemented in the audio system comprises the step of adjusting the parameters of the at least two filters of the second set of parameterisable equalisation filters.

19. The system of claim 14, wherein the system is further configured to implement: the module for acquiring the amplitude values of the audio signal; the module for calculating the target spectral amplitude curve; the module for first determining of the first set of parameterisation filters; and the module for second determining of the second set of parameterisable equalisation filters.

* * * * *